(12) United States Patent
Owen et al.

(10) Patent No.: US 9,839,198 B2
(45) Date of Patent: Dec. 12, 2017

(54) ANIMAL GROOMING TOOL

(71) Applicants: Sarah Owen, Santa Ynez, CA (US);
Dennis Domingos, Buellton, CA (US)

(72) Inventors: Sarah Owen, Santa Ynez, CA (US);
Dennis Domingos, Buellton, CA (US)

( * ) Notice: Subject to any disclaimer, the term of this patent is extended or adjusted under 35 U.S.C. 154(b) by 0 days.

(21) Appl. No.: 14/875,585

(22) Filed: Oct. 5, 2015

(65) Prior Publication Data
US 2016/0095295 A1    Apr. 7, 2016

Related U.S. Application Data

(63) Continuation-in-part of application No. 14/507,725, filed on Oct. 6, 2014, now abandoned.

(51) Int. Cl.
*A01K 13/00* (2006.01)

(52) U.S. Cl.
CPC ............ *A01K 13/002* (2013.01); *A01K 13/00* (2013.01)

(58) Field of Classification Search
CPC .... A01K 13/00; A01K 13/001; A01K 13/002; A46B 2200/1093; A46B 2200/104
USPC ................................................ 119/600–633
See application file for complete search history.

(56) References Cited

U.S. PATENT DOCUMENTS

| | | | | |
|---|---|---|---|---|
| 3,160,142 A * | 12/1964 | Torow | ................. | A01K 13/002 119/623 |
| 4,604,971 A * | 8/1986 | Baker | ................... | A01N 25/34 119/605 |
| 5,267,528 A * | 12/1993 | Murieen, Sr. | ......... | A46B 17/06 119/628 |
| 5,485,807 A * | 1/1996 | Bertwell | ................. | A46B 1/00 119/632 |
| 5,626,099 A * | 5/1997 | Staller | ................... | A01K 13/00 119/600 |
| 5,690,057 A * | 11/1997 | Curry | ................... | A01K 13/002 119/623 |
| 6,109,214 A * | 8/2000 | Rampersad | ......... | A01K 13/002 119/600 |
| 2002/0078902 A1* | 6/2002 | Ehrmann | ............. | A01K 13/002 119/625 |
| 2007/0144451 A1* | 6/2007 | Hurwitz | ............... | A01K 13/002 119/603 |
| 2009/0173287 A1* | 7/2009 | Wang | ................... | A01K 13/002 119/625 |
| 2012/0291717 A1* | 11/2012 | Rifkin | ................. | A01K 13/002 119/600 |
| 2015/0000609 A1* | 1/2015 | Frye | ..................... | A01K 13/003 119/601 |
| 2015/0047576 A1* | 2/2015 | Dauphin | ............. | A01K 13/002 119/633 |

* cited by examiner

*Primary Examiner* — Patrick Hawn
(74) *Attorney, Agent, or Firm* — Felix L. Fischer (57) ABSTRACT

A animal grooming tool employs a substantially rectangular body having a top surface, a lower surface, a first end, a second end and two sides. The body is composed of flexible material with a hardness of between 20 and 60 Shore A for enhanced attraction of hair for removal.

6 Claims, 12 Drawing Sheets

ANIMAL GROOMING TOOL

REFERENCE TO RELATED APPLICATIONS

This application is a continuation-in-part of application Ser. No. 14/507,725 filed on Oct. 6, 2014 having common inventors with the present application, the disclosure of which is incorporated herein by reference.

BACKGROUND INFORMATION

Field

Embodiments of the disclosure relate generally to the field of equine care and more particularly to a tool for grooming horses employing shaping and a compacted adhered rubber composition in a hand held body for hair and dust removal.

Background

Grooming of horses and other animals is a time consuming and labor intensive task. However, enhanced health benefits of regular grooming and, for show and general riding purposes, a very clean coat on the horse for appearance are highly desirable. Most equine grooming is accomplished with a curry comb and/or dandy brush with repeated strokes to thoroughly clean dust and shedding hair from the horse. The entire horse must be groomed including the body, neck, head and legs. Uneven surfaces, particularly around tendons and bony protrusions in the legs, cannons, hocks and pasterns, are typically very sensitive areas of the horse and grooming must be accomplished carefully. Similarly with dogs and cats, brushes or shedding combs are typically employed which have the same issues.

Curry combs, whether plastic or metal, tend to be very stiff and many horses find their use uncomfortable. Such devices may be particularly unsuitable for the sensitive legs, cannons, hocks and pasterns. Further, while curry combs typically break up dirt and shedding hair in the horses coat, brushing with a fairly stiff brush is typically still be required to fully remove detritus by a curry comb, or as a single use tool without the use of a curry comb, and the stiff bristles of such brushes may also create discomfort for certain horses. Shedding brushes are typically similar with either hard plastic or wire shedding elements and dogs and cats may dislike use of the brush.

Removal of hair from animal accessories such as horse blankets or saddle pads, dog coats or animal bed mats is similarly challenging and a standard brush often does not remove the hair and dirt.

It is therefore desirable to provide a grooming tool which does not create discomfort for even sensitive animals and allows cleaning of sensitive body areas as well as overall body grooming and may be employed for removal of hair from animal accessories.

SUMMARY

Exemplary embodiments provide an animal grooming tool with a body having a top surface, a lower surface, a first end, a second end and two sides. The body is composed of a flexible material having a durometer of 20-65 Shore A with vulcanized polymer rubber or PTE as exemplary materials.

In one embodiment the body is substantially rectangular and incorporates edges between the top surface and sides and lower surface and sides, which are substantially perpendicular at the edges.

An additional feature of fillets between the first end and one or both sides is also disclosed. In an alternative embodiment fillets at both ends with one or both sides may also be employed.

Yet another feature of reverse filleted ends on the upper surface is also disclosed.

In alternative embodiment the body may be tapered between a top edge and a bottom edge with the top edge sculpted with a gripping indentation and the bottom edge having texture or protrusions for additional surface contact.

In yet another embodiment the body may have a bottom surface that is stepped with an array of ramps. In one example the ramps may have an angular gradient.

The features, functions, and advantages that have been discussed can be achieved independently in various embodiments of the present invention or may be combined in yet other embodiments further details of which can be seen with reference to the following description and drawings

DETAILED DESCRIPTION

The embodiments described herein disclose a grooming tool sized to fit the groomer's hand and having a body composed of finely ground, compacted and adhered rubber. While usable on all parts of the horse including hooves, for hair removal as well as cleaning of tack and the scrapping of sweat and water, the body is also shaped for contact with delicate body surfaces and may incorporate at least one side with a textured surface. A hole in the body may be provided for attachment of a wrist lanyard to enhance usability of the tool.

Referring to the drawings, FIGS. 1 through 5 show an exemplary embodiment of the horse grooming tool 10. The tool has a substantially rectangular body 12 with a top surface 14 and bottom surface 16 which act as primary cleaning surfaces. A first end 18 and a second end 19 and side walls 20 provide alternative cleaning surfaces. A first example of the grooming tool is approximately 2" in width and 9" in length with a thickness of approximately ¾". An alternative example of the tool for use by groomers with smaller hands or to be "pocket sized" is approximately 2⅜" in width and 4¾" in length with a thickness of approximately ⅜" and is described in detail subsequently. Sizing of the tool between these two sizes to accommodate specific needs may be accomplished in alternative embodiments.

Top surface 14 and bottom surface 16 provide planar surfaces for broad cleaning strokes on the body and neck of the horse. Sides 20 and associated edges 22 between the sides and top and bottom surfaces may be employed for enhanced shedding with the tool. For the embodiment shown, the sides and top and bottom surfaces are substantially perpendicular at edges 22. However the resilient material of the tool avoids discomfort for the horse. Similarly, the first end 18 and second end 19 may be employed for grooming in portions of the body having close curves or grooves such as the cannons, hocks and pasterns. Fillets 24 may be present between one or both of the sides 20 and the first end 18 to enhance the contact of the tool in such areas where a sharper edge may not be desirable. Similarly, fillets may be employed between the sides 20 and second end 19, if desired.

Figure 5:
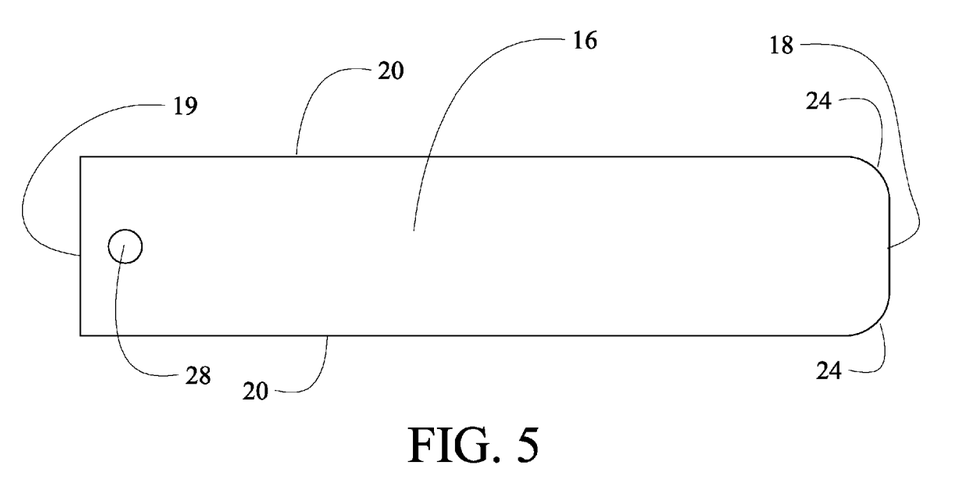
FIG. 5 is a bottom view of the embodiment.
Figure 6:
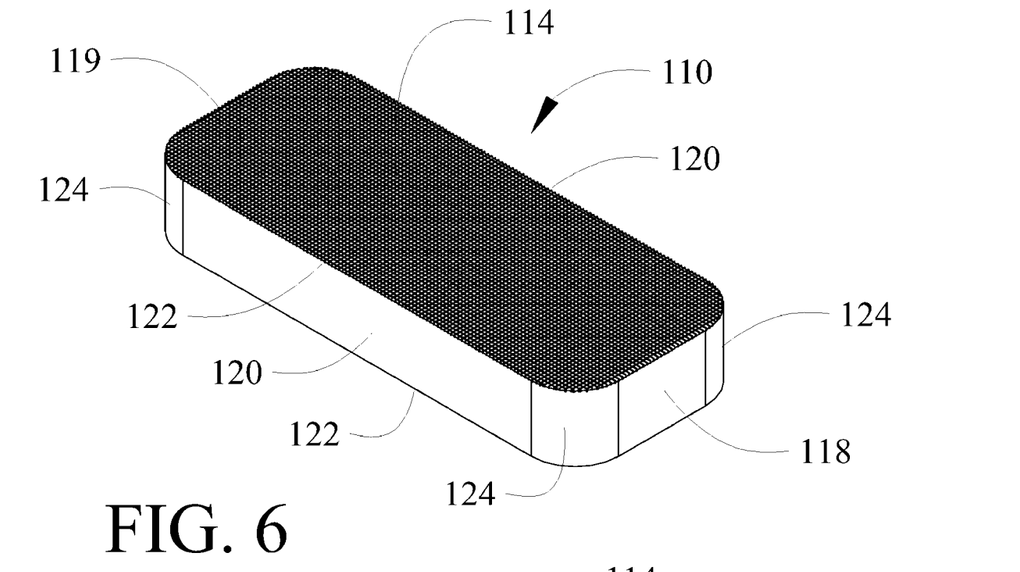
FIG. 6 is a pictorial view of a second embodiment of the grooming tool.
Figure 7:
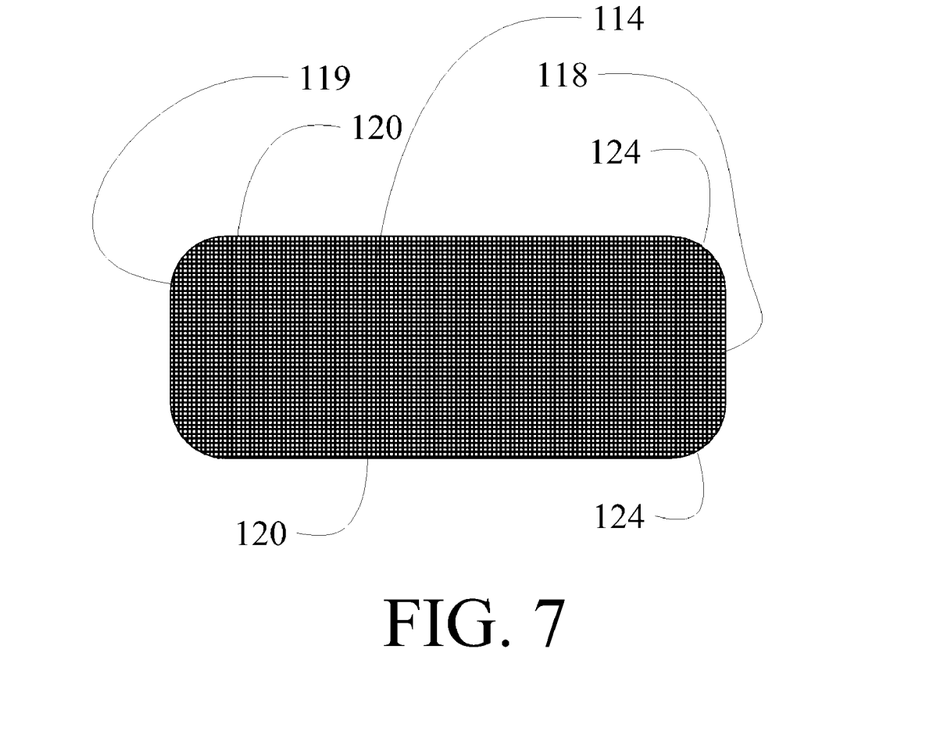
FIG. 7 is a top view of the second embodiment.
Figure 8:
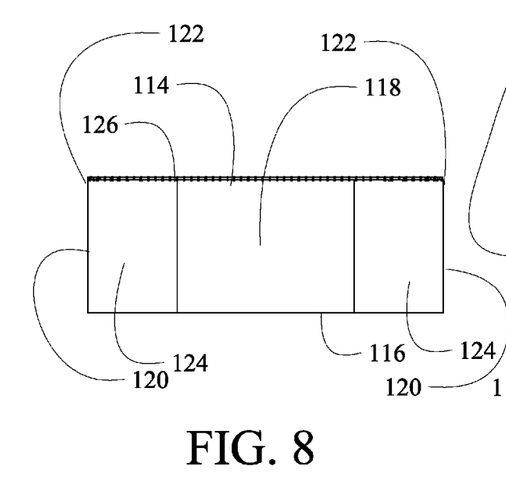
FIG. 8 is a first end view of the second embodiment.
Figure 9:
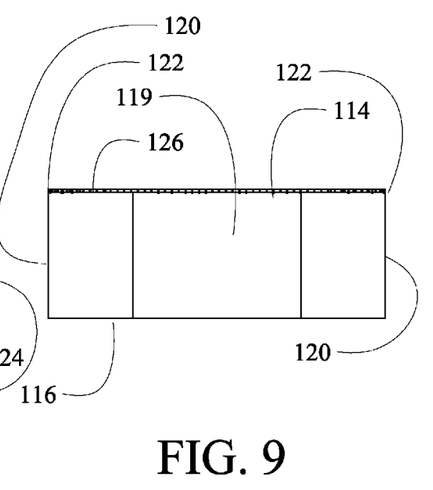
FIG. 9 is second end view of the second embodiment.

As seen in FIGS. 1, 2, 3 and 4, the top surface 14 of the tool 10 may be textured to enhance the effectiveness of the surface in loosening dirt and shedding hair. Low profile elliptical or diamond shaped protrusions 26 arranged in an array to create the texture have been demonstrated on example implementations of the tool. While a symmetrical array is shown, an asymmetrical array may be used in alternative embodiments. For the example tool the bottom surface 16 is untextured as shown in FIG. 5 to provide an alternative cleaning effect. However in alternative embodiments, both surfaces may be textured.

Figure 1:
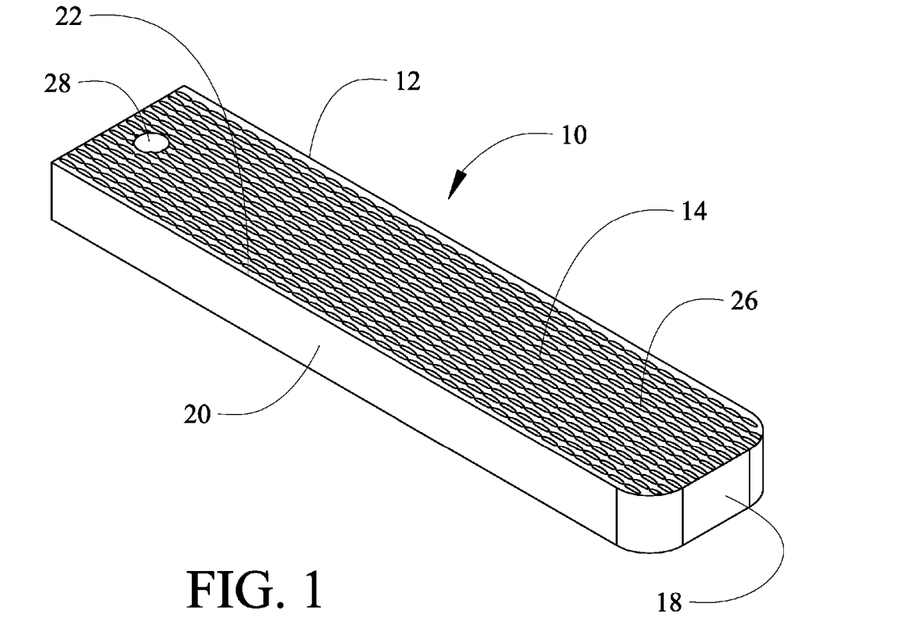
FIG. 1 is a pictorial view of a first embodiment of the grooming tool.
Figure 2:
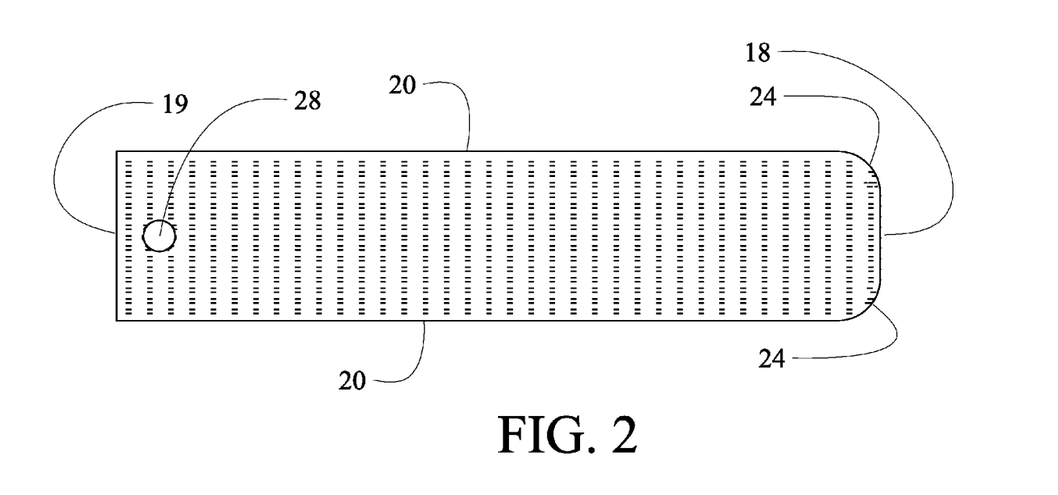
FIG. 2 is a top view of the embodiment.
Figure 3:
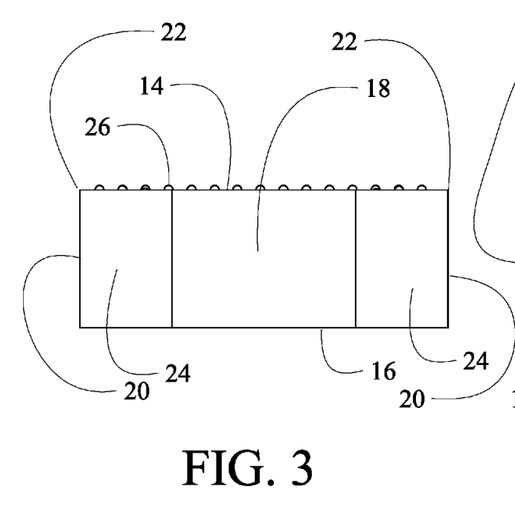
FIG. 3 is a first end view of the embodiment.
Figure 4:
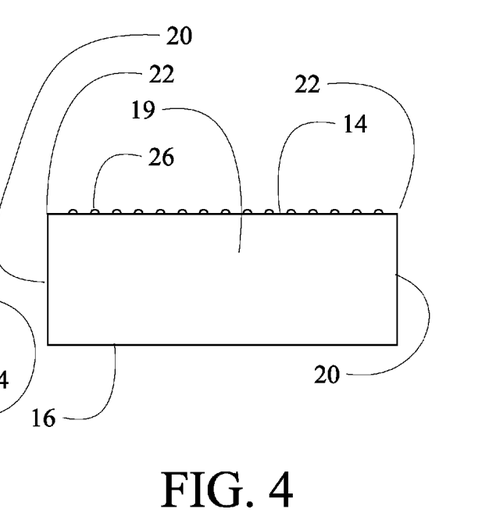
FIG. 4 is second end view of the embodiment.

As seen in FIGS. 1, 2 and 5, an aperture 28 may be provided through the body 12 proximate the second end 19 to allow a lanyard (not shown) to be passed through and knotted. The lanyard can then be placed around the wrist of the groomer to allow the tool to be retained for use without directly grasping the tool with the hand thereby freeing the hand.

For grooming a horse or other animal, the body 12 of the tool is grasped in the hand and either the flat of the top or bottom surface, the sides, or the first or second end is rubbed against the portion of the horse on which grooming is desired. As previously described, the body 12 may be angled to engage one of the edges 22 with the coat of the horse. The body 12 is then moved in a smooth stroke to clean dirt and hair from the horse's coat. The fillets 24 may be inserted into grooves or tight curves on the body of the horse for cleaning.

The pocket sized or "mini" tool is shown in FIGS. 6-10. The mini tool 100 has a substantially rectangular body 112 with a top surface 114 and bottom surface 116 which act as primary cleaning surfaces. A first end 118 and a second end 119 and side walls 120 provide alternative cleaning surfaces.

Top surface 114 and bottom surface 116 provide planar surfaces for broad cleaning strokes on the body and neck of the animal. Sides 120 and associated edges 122 between the sides and top and bottom surfaces may be employed for enhanced shedding with the tool. For the embodiment shown, the sides and top and bottom surfaces are substantially perpendicular at edges 122. However the resilient material of the tool avoids discomfort for the animal. Similarly, the first end 118 and second end 119 may be employed for grooming in portions of the body having close curves or grooves such as the cannons, hocks and pasterns. Fillets 124 may be present between one or both of the sides 120 and the first end 118 and/or second end 110 to enhance the contact of the tool in such areas where a sharper edge may not be desirable.

Figure 10:
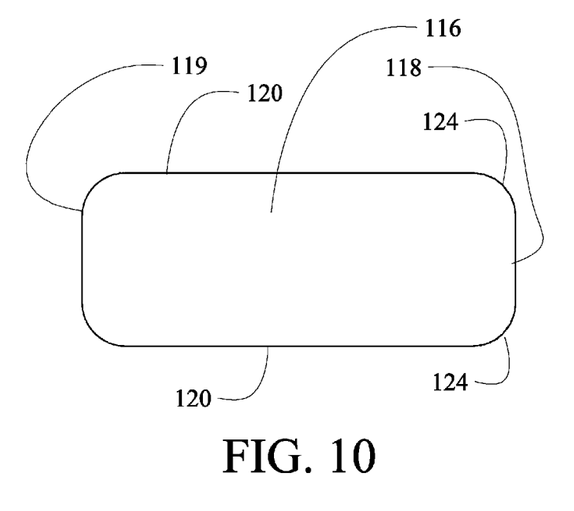
FIG. 10 is a bottom view of the second embodiment.
Figure 11:
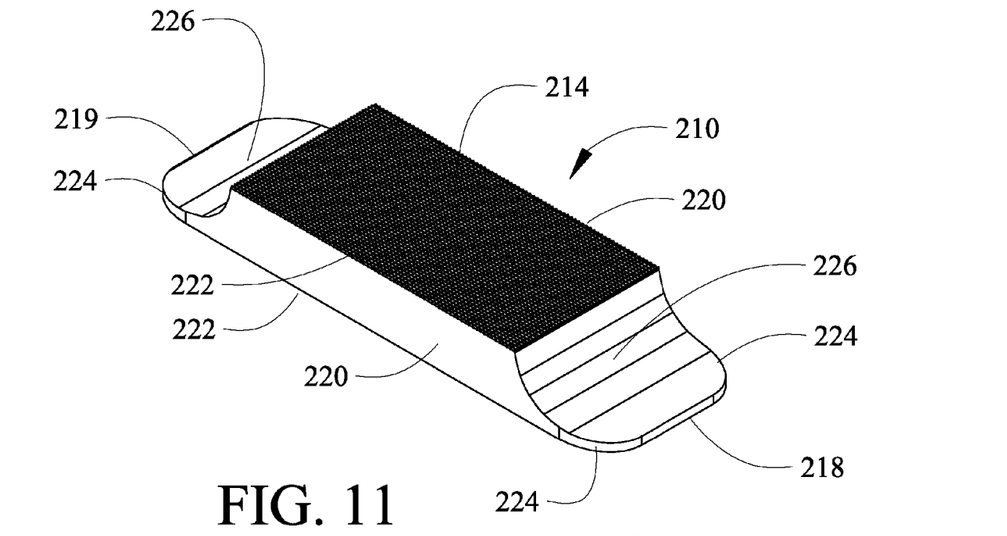
FIG. 11 is a pictorial view of a third embodiment of the grooming tool.
Figure 12:
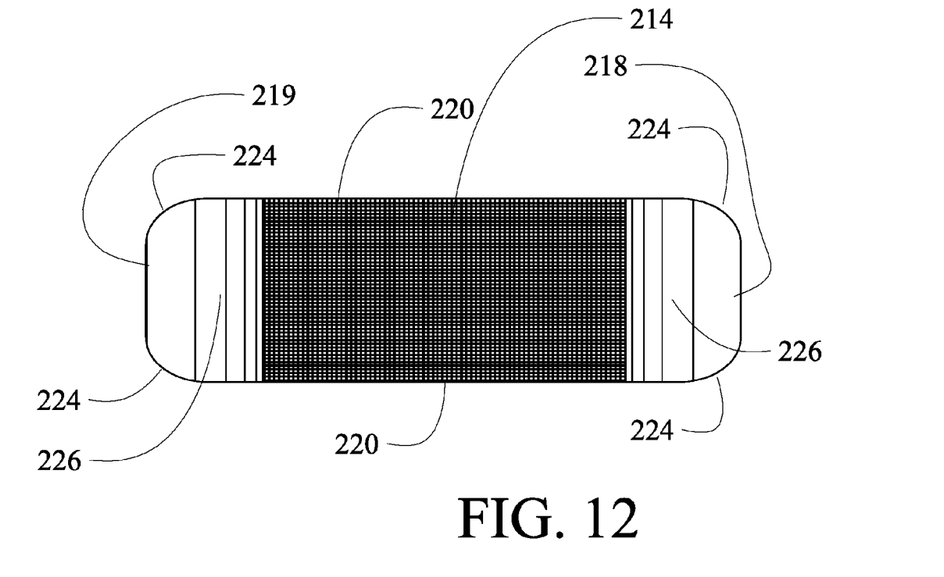
FIG. 12 is a top view of the third embodiment.
Figures 13, 14:
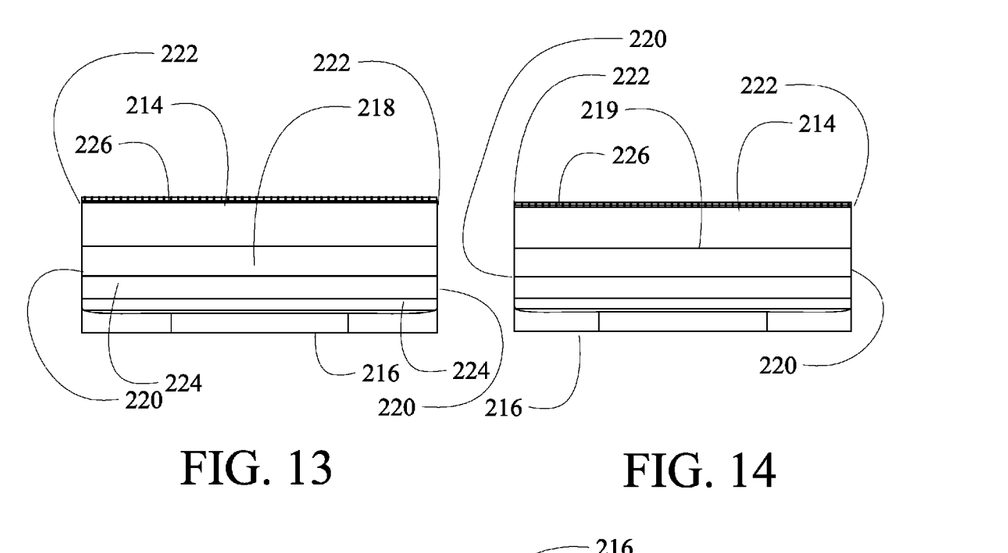
FIG. 13 is a first end view of the third embodiment.
FIG. 14 is second end view of the third embodiment.

As seen in FIGS. 6, 7, 8 and 9, the top surface 114 of the tool 110 may be textured to enhance the effectiveness of the surface in loosening dirt and shedding hair. Low profile elliptical or diamond shaped protrusions as employed in the initial embodiment or rectangular protrusions in a waffle pattern as shown in the drawings may be arranged in an array to create the texture have been demonstrated on example implementations of the tool. While a symmetrical array is shown, an asymmetrical array may be used in alternative embodiments. For the example tool the bottom surface 116 is untextured as shown in FIG. 10 to provide an alternative cleaning effect. However in alternative embodiments, both surfaces may be textured.

A third embodiment of the tool employing reverse fillets on end portions of the tool is shown in FIGS. 11-15. The all-in-one tool 200 has a substantially rectangular body 212 with a top surface 214 and bottom surface 216 which act as primary cleaning surfaces. A first end 218 and a second end 219 and side walls 220 provide alternative cleaning surfaces. The third embodiment additionally incorporates a large reverse fillet in end portions 226 (seen best in FIGS. 11 and 12) which makes those portions very flexible for enhanced cleaning by allowing the fillets 224 and ends 218 and 219 very pliable.

Top surface 214 and bottom surface 216 provide planar surfaces for broad cleaning strokes on the body and neck of the animal. Sides 220 and associated edges 222 between the sides and top and bottom surfaces may be employed for enhanced shedding with the tool. For the embodiment shown, the sides and top and bottom surfaces are substantially perpendicular at edges 222. However the resilient material of the tool avoids discomfort for the animal. Similarly, the first end 218 and second end 219 may be employed for grooming in portions of the body having close curves or grooves such as the cannons, hocks and pasterns. Fillets 224 may be present between one or both of the sides 220 and the first end 218 and/or second end 210 to enhance the contact of the tool in such areas where a sharper edge may not be desirable.

Figure 15:
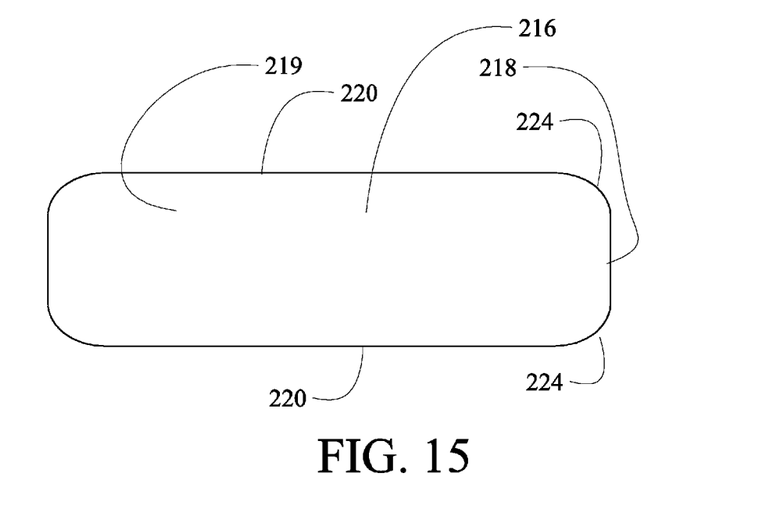
FIG. 15 is a bottom view of the third embodiment.

As seen in FIGS. 11, 12, 13 and 14, the top surface 214 of the tool 210 may be textured to enhance the effectiveness of the surface in loosening dirt and shedding hair. Low profile elliptical, diamond or rectangular waffle shaped protrusions as employed in the initial embodiment or rectangular protrusions as shown in the drawings may be arranged in an array to create the texture have been demonstrated on example implementations of the tool. While a symmetrical array is shown, an asymmetrical array may be used in alternative embodiments. For the example tool the bottom surface 216 is untextured as shown in FIG. 15 to provide an alternative cleaning effect. However in alternative embodiments, both surfaces may be textured.

Figure 16:
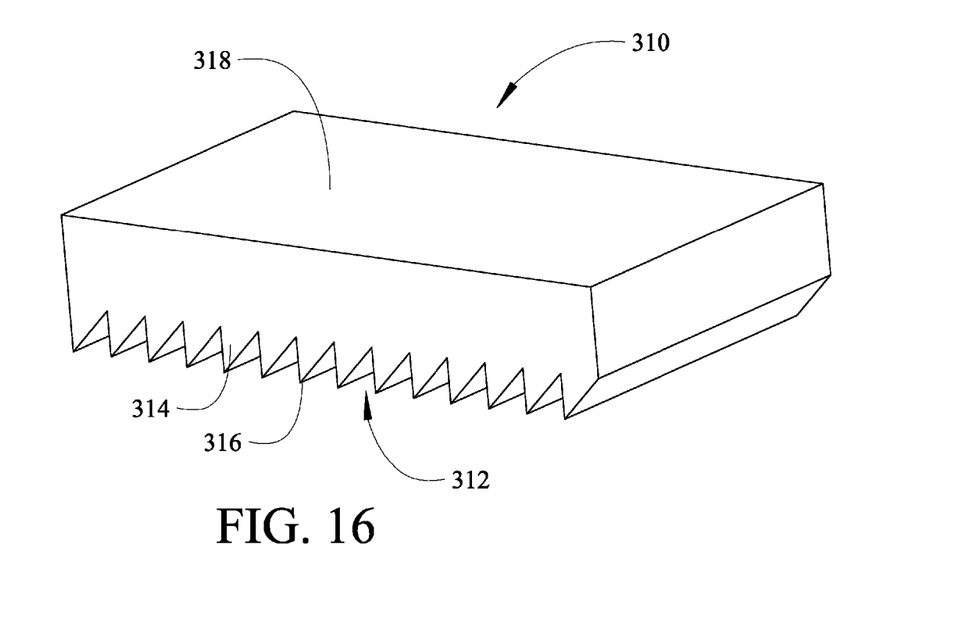
FIG. 16 is a top pictorial view of a fourth embodiment of the grooming tool.
Figure 17:
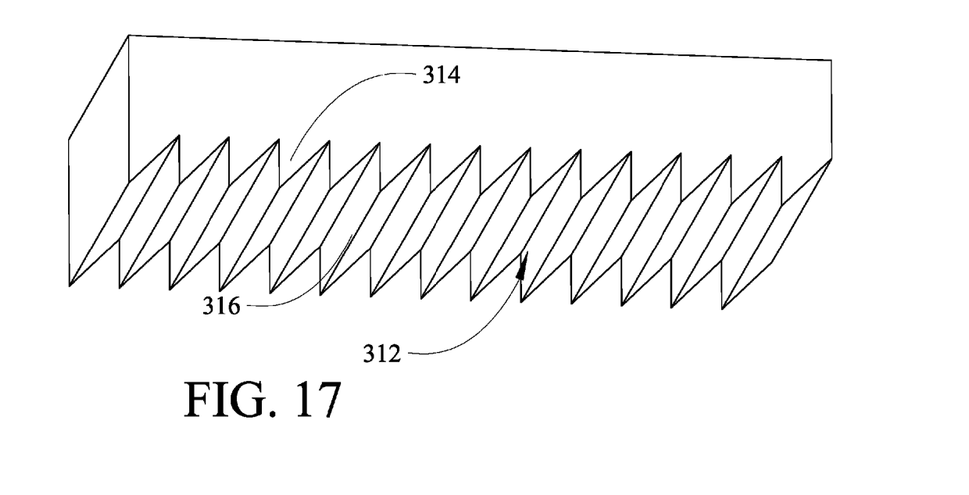
FIG. 17 is a bottom pictorial view of the fourth embodiment.
Figure 18:
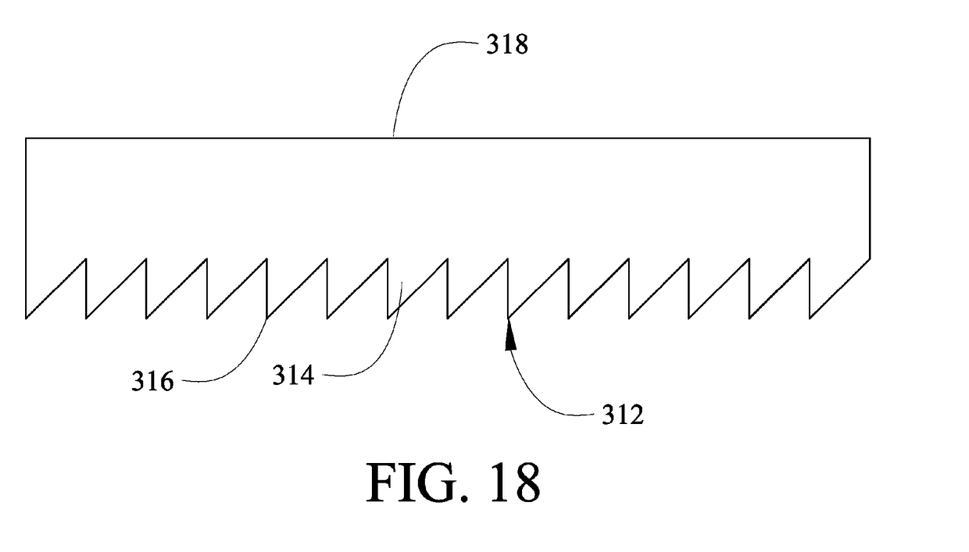
FIG. 18 is a side view of the fourth embodiment.

A fourth embodiment of the tool is shown in FIGS. 16-18. For certain applications, particularly where the tool may additionally be employed for cleaning animal accessories such as horse blankets, saddle pads, or dog coats, it is desirable to have a very textured or serrated surface to rub against the animal's coat or the surface of the accessory. The ridge tool 310 provides the bottom surface 312 with an array of ridges 314. For the exemplary embodiment, the ridges extend over the entire bottom surface. However in alternative embodiments, the ridges may extend over only or portion of the bottom surface. The relative flexibility of the tool body makes the tips 316 of the ridges quite flexible to avoid a truly sharp contact with the animal or accessory, flexing to draw hair from the animal's body or accessory surface. The top surface 318 may be smooth or textured as described in prior embodiments for an alternative cleaning effect.

Figure 19:
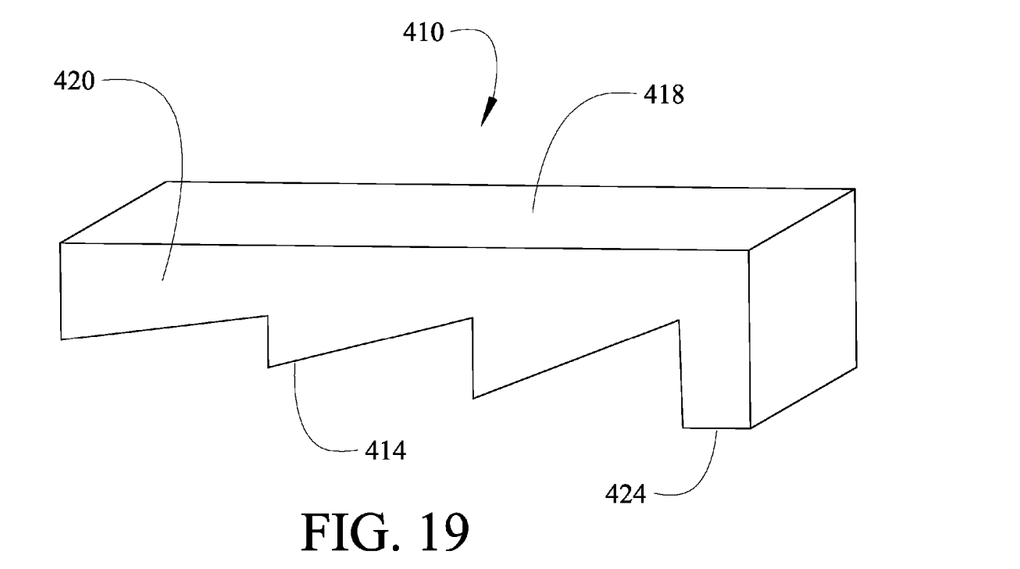
FIG. 19 top pictorial view of a fifth embodiment of the grooming tool.
Figure 20:
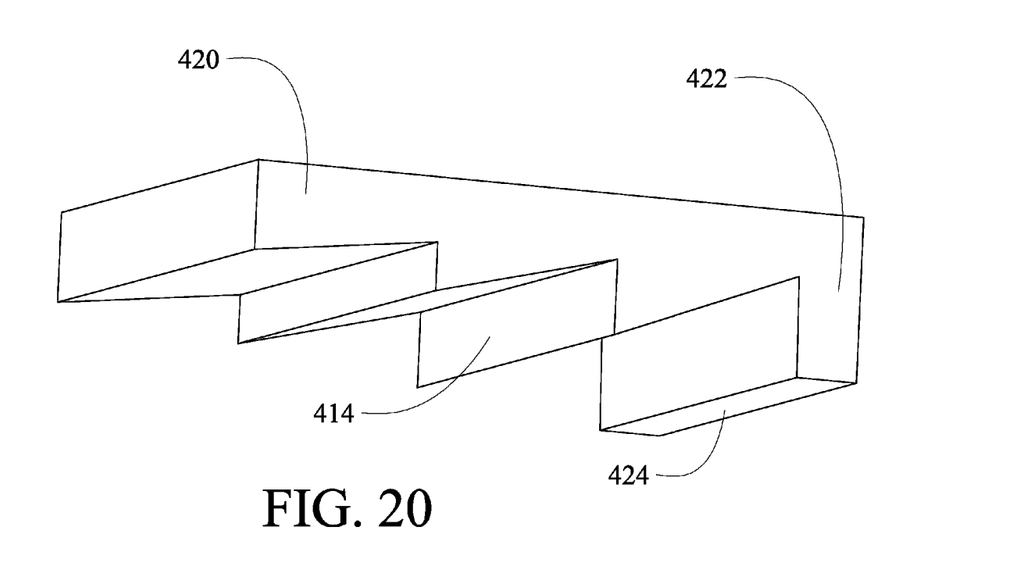
FIG. 20 is a bottom pictorial view of the fifth embodiment.
Figure 21:
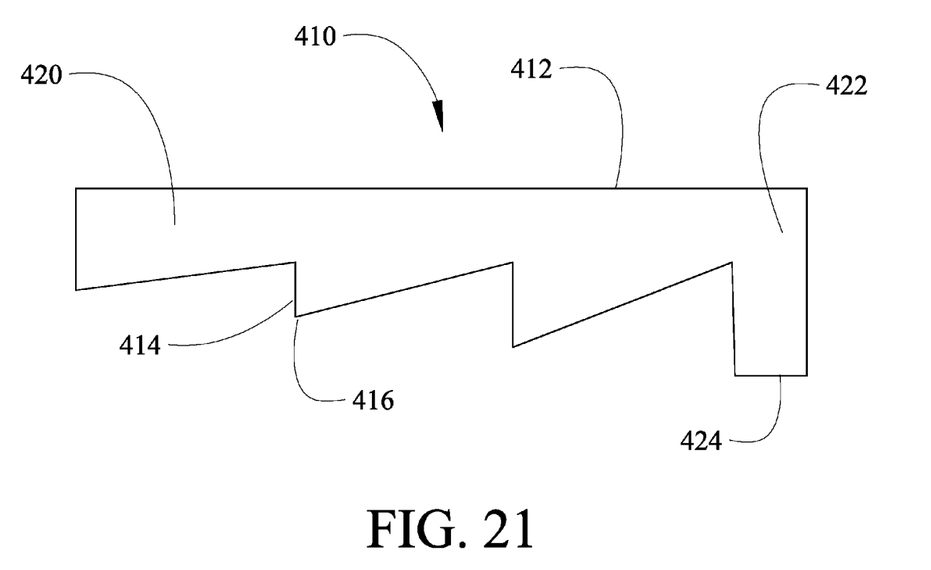
FIG. 21 is a side view of the fifth embodiment.
Figure 22:
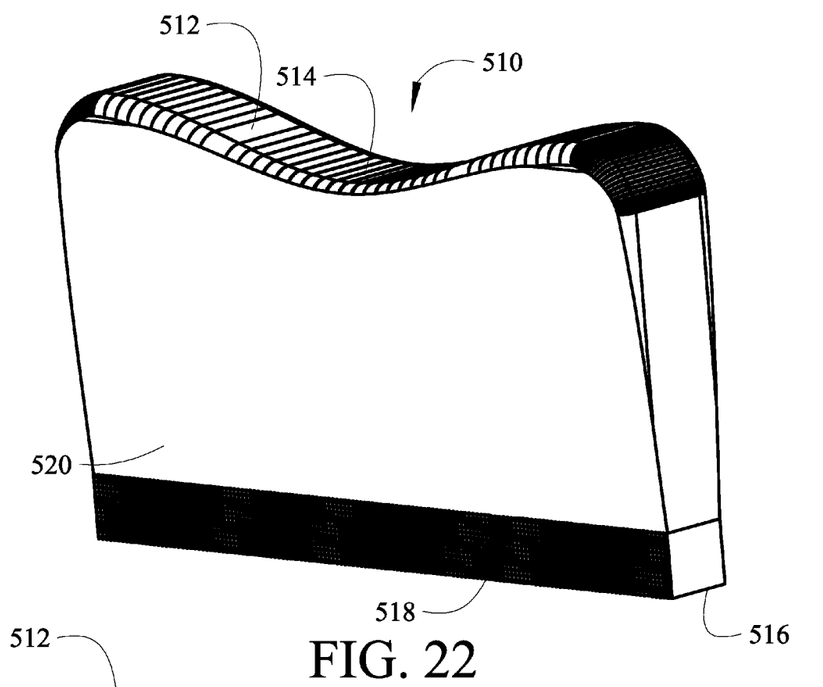
FIG. 22 is a is a top pictorial view of a sixth embodiment of the grooming tool.
Figure 23:
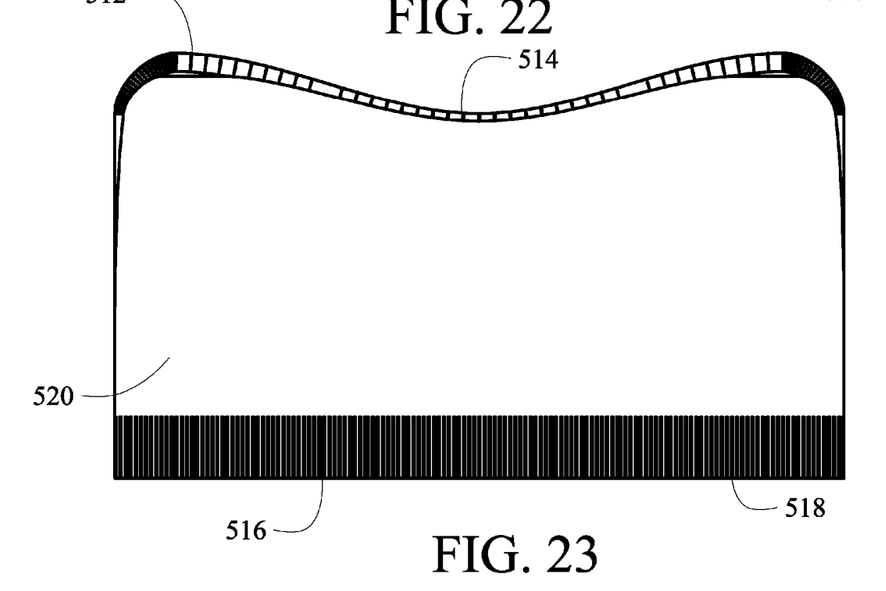
FIG. 23 is a side view of the sixth embodiment.
Figure 24:
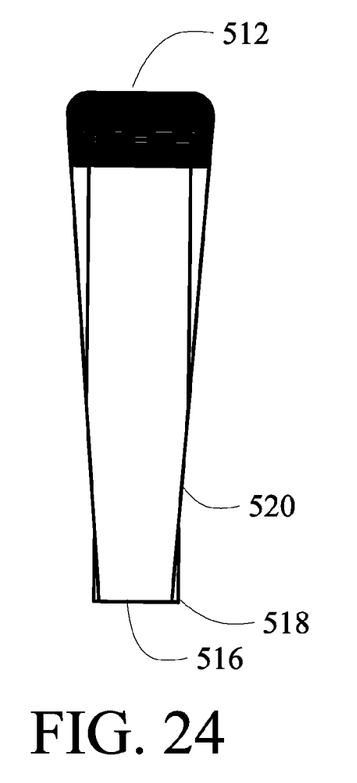
FIG. 24 is an end view of the sixth embodiment; and,
FIG. 25 is a bottom pictorial view of the sixth embodiment.
Figure 25:
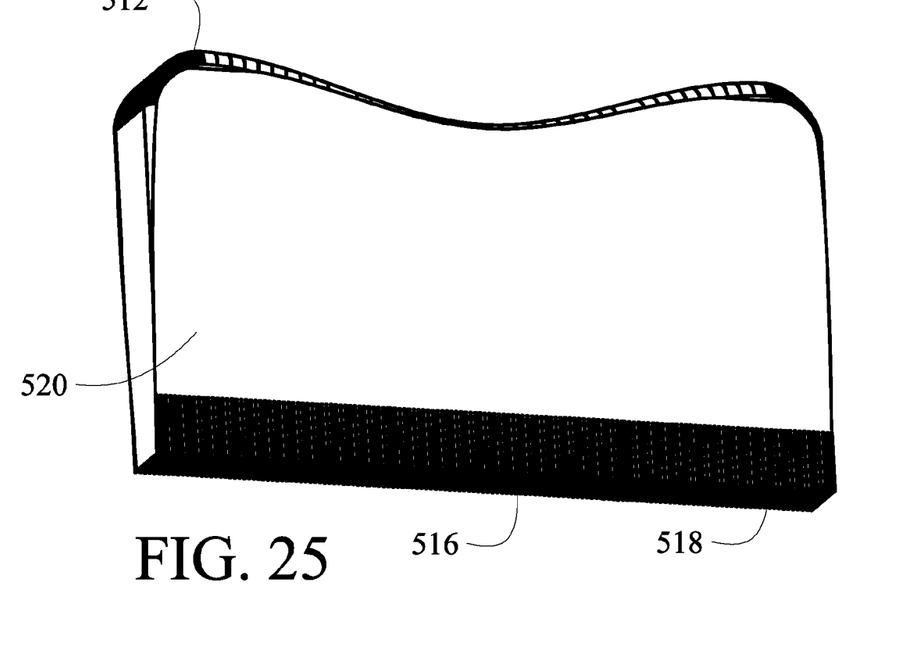

An alternative an fifth embodiment is shown in FIGS. 19-21 wherein the array of ridges 414 in the tool sloped ridge tool 410 are inclined by between 6 and 8 degrees relative to the top surface 418 thereby making a first end portion 420 of the tool more flexible. The tips 416 of the ridges operate in a manner similar to the fourth embodiment. Additionally, a block end on a second end portion 422 provides a following surface 424 which may receive additional pressure from the heel of the user's palm. This allows an enhanced cleaning effect particularly for scrubbing surfaces of animal accessories such as saddle pads or horse blankets.

A sixth embodiment which enhances the use of the smaller dimensioned surfaces of the tool body is shown in FIGS. 22-25. One of the smaller dimension surfaces of the tool 510 becomes the top 512 which is sculpted to provide a gripping indentation 514. The tool 510 is tapered from the top 512 to a bottom surface 516. Texture elements 518 provide texture on the bottom surface and may extend upward onto a lower portion of the sides 520 allowing the tool to be brushed longitudinally or laterally on the animal's coat or on an animal accessory.

The body of the various tool embodiments is formed from a flexible material having a hardness in a range of 20-60 Shore A and a density in the range of 55 to 70 lbs/ft$^3$. In certain exemplary embodiments the body is formed from a vulcanized rubber polymer. An exemplary composition constitutes fine ground rubber which has been compressed and adhered using latex adhesive, sulfur and process oil. The composition includes as percent by weight 93% fine ground rubber, as from recycled rubber tires, 2.4% Polymer, 1.9% Sulfur and 2.8% process oil (solvent refined and hydro treated). Trace amounts of 1, 3 Butadiene and Styrene may be present. The composition provides a specific gravity of approximately 1.12 with a density of 70 lbs/cuft. A Shore A durometer value of between 60 and 65 is desirable with a value of 63 being used for the example embodiments. In other exemplary embodiments the material constitutes Thermoplastic Elastomer (TPE) such as Versollan, Versaflex, Versalloy, Dynaflex and Wetgrip Custom TPE 20 available from PolyOne Corporation in McHenry, Ill. again having a durometer value of between 20 and 60 Shore A to provide a hardness compatible with efficacious removal of hair from either animals or animal accessories.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. An animal grooming tool comprising:
   a body having
   a top surface, a bottom surface, a first end, a second end and two sides wherein at least one fillet is provided between the first end an one side, said body composed of vulcanized rubber having a hardness of between 20 and 65 Shore A and wherein the vulcanized rubber includes as percent by weight 2.4% Polymer, 1.9% Sulfur, 2.8% process oil and the remainder ground rubber and 1, 3 Butadiene and Styrene.

2. The animal grooming tool as defined in claim 1 wherein the vulcanized rubber has a Shore A durometer value of between 60 and 65.

3. The animal grooming tool as defined in claim 1 wherein the body is substantially rectangular and incorporates edges between the top surface and sides and bottom surface and sides, which are substantially perpendicular at the edges.

4. The animal grooming tool as defined in claim 1 wherein the top surface is textured.

5. The animal grooming tool as defined in claim 4 wherein the texture is an array of low profile protrusions selected from a set of elliptical or diamond shaped protrusions.

6. The animal grooming tool as defined in claim 5 wherein the array is symmetrical.

* * * * *